Patented Sept. 26, 1922.

1,430,270

UNITED STATES PATENT OFFICE.

WILLIAM GEORGE WARING, OF WEBB CITY, MISSOURI, ASSIGNOR OF ONE-HALF TO GORDON BATTELLE, OF COLUMBUS, OHIO.

EXTRACTION OF LEAD AND ZINC.

No Drawing.   Application filed August 17, 1921.   Serial No. 493,133.

*To all whom it may concern:*

Be it known that I, WILLIAM GEORGE WARING, a citizen of the United States, residing at Webb City, in the county of Jasper and State of Missouri, have invented certain new and useful Improvements in the Extraction of Lead and Zinc, of which the following is a specification.

This invention relates to the extraction of lead and zinc; and it comprises an improvement in the methods of treating metallurgical products containing lead and zinc in oxidized form, such as roasted ore, flue dust, fume, etc., with hot ammonium sulfate solutions to extract zinc therefrom, wherein the solid residues from such extraction are treated with an ammonium carbonate solution to convert lead sulfate into lead carbonate and furnish a solution of ammonium sulfate useful in the extraction steps; all as more fully hereinafter set forth and as claimed.

In various metallurgical processes there is a production of materials containing both zinc and lead in oxidized form (as oxid, carbonate or sulfate) and these materials are difficult of treatment by dry methods for the separate recovery of the contained values. This is true of various roasted or calcined complex ores containing both metals; of certain residues from electrolytic zinc production and of the fume produced in various furnace operations treating sulfid ores. Fume of this character is produced as the main product in furnaces of the type of the Scotch hearth, the Wetherill furnace, etc., and as an incidental product in many other types of furnace, as in reverberatory roasting and smelting furnaces treating complex ores. These materials, of course, often contain other metals than zinc and lead; and it is desirable to recover these values. Very many methods have been proposed for the treatment of materials of this kind; and some of these methods are in use. Sometimes materials of this class are simply treated with sulfuric acid to extract zinc, etc., and leave the lead as sulfate; but generally other methods are deemed better. Some of these processes are based on the principle that a boiling or hot solution of the ammonium sulfate will hold more zinc in solution than it can retain at lower temperatures, and in these processes the material is extracted with hot ammonium sulfate solution, the solution cooled to deposit zinc compounds and then reheated and once more used for extraction. Not all the zinc is deposited in the cooling but since the solution goes back for re-use, this is not material. In one embodiment of such a process, fume or roasted ore is digested at a high temperature and at a pressure slightly above atmosphere with a solution of ammonium sulfate; this solution being saturated, or nearly so, with ammonium sulfate and also carrying more or less dissolved zinc. Zinc compounds go into solution while lead remains behind as sulfate. After the digestion operation, the liquid is separated from the solid residue, is passed through a hot chamber containing zinc shot, scrap, etc., to remove readily reducible metals such as cadmium, silver, copper, etc., and is then cooled to deposit zinc compounds. With an ammonium sulfate solution of the stated strength, on cooling to a temperature of about 50° to 70° C., the deposited zinc compound is a basic sulfate having the empirical composition $5ZnO, SO_3$; while with other strengths and at other temperatures, the deposited material though containing zinc may have a different composition. It may at times be a double salt of ammonium sulfate and a zinc sulfate. The zinc-containing precipitate is worked up in ways not necessary here to detail.

After the digestion of the material with the ammonium sulfate solution, the zinc-containing liquid is ordinarily separated from the solid residue by means of a filter press, the press cake being sometimes washed with a strong solution of ammonium sulfate to remove as much zinc as possible. It is not desirable to wash it with water, since the sulfate solution on dilution is apt to give a precipitation of zinc compounds. Ordinarily, the press cake consists, for the most part, of lead sulfate; other lead salts being converted into sulfate by the ammonium sulfate solution, but in addition, it contains to a greater or less extent compounds of zinc and other metals as well as considerable amounts of ammonium sulfate which must be removed or the ammonia recovered. The extraction of zinc by the sulfate solution is never complete and, in any event, there is usually left some portion of the mother liquor containing dissolved zinc. There may also be in the extraction operation itself a formation of insoluble zinciferous double salts which remain with the lead sulfate.

In other words while this ammonium sulfate method of extraction is, at least in the embodiment more particularly described, a convenient and economical mode of operation, yet the zinc extraction is not complete and the extracted residue is left containing various valuable materials (in addition to the zinc) which must be extracted and recovered.

It is the object of the present invention to treat such a residual material or the other materials mentioned containing lead and zinc, by a convenient and economical method, converting the lead sulfate into the more available form of lead carbonate and recovering ammonia, zinc, etc. with production of ammonium sulfate useful in the extraction operation. To this end, the press cake or other material is treated with water containing ammonium carbonate; the amount of ammonia present being about equivalent to the lead. Neither heat nor pressure is necessary although slight heating hastens the operation. Where the materials are heated any ammonia expelled is recovered in suitable ways. While other strengths may be used, a solution containing ammonium carbonate equivalent to 5 to 8 per cent $NH_3$, is generally most suitable. It is best to stir energetically or otherwise produce intimate and thorough contact of the liquid and solid materials. The lead sulfate is smoothly converted into lead carbonate with a concomitant production of ammonium sulfate which goes into solution. Any zinc compounds which may be present also go into solution. Such ammonium sulfate as is present goes into solution, joining that formed in the operation itself. The solution produced in the way described being an ammonium sulfate solution, usually containing more or less zinc, may be employed in extracting more material. If necessary, it may be preliminarily strengthened by evaporation, or in another way, prior to its use in extraction.

Instead of using the ammonium sulfate solution so produced for extraction purposes, it may of course be decomposed by lime, etc., to set free the ammonia and the ammonia converted into ammonium carbonate solution.

As a result of the treatment with the ammonium carbonate solution, the lead sulfate is converted into lead carbonate which is, at least in the case of many of these residues, of great fineness and high pigmentary value. It may be utilized as pigment. Where it contains silver, bismuth or antimony in any appreciable amount, however, it may be desirable to refine it by dry methods as, for example, by reduction with carbon, to give metal; this metal being afterward treated in the usual ways. It may be mentioned in this connection that the lead carbonate produced in the present invention is much more amenable to the ordinary metallurgical refining methods than the original lead sulfate.

What I claim is:—

1. In the utilization of ore products containing lead and zinc values, the process which comprises extracting such products with a hot solution of ammonium sulfate to remove zinc and leave residues containing lead, treating such residues with a solution of ammonium carbonate containing $NH_3$ equivalent to the $SO_3$ present in the residues, thereby forming lead carbonates and an ammonium sulfate solution containing zinc and returning said ammonium sulfate solution for re-use in the extraction step.

2. In the process of treating materials containing both lead and zinc in oxidized form with hot ammonium sulfate solution to abstract zinc compounds therefrom, the process which comprises treating the solid residue with ammonium carbonate solution to convert the lead sulfate thereof into lead carbonate and recover further zinc therefrom while forming a solution of ammonium sulfate.

In testimony whereof, I have hereunto affixed my signature.

WILLIAM GEORGE WARING.